No. 832,666. PATENTED OCT. 9, 1906.
C. HAMANN.
CALCULATING MACHINE.
APPLICATION FILED MAR. 28, 1905.

Witnesses:

Inventor:
Christel Hamann

No. 832,666. PATENTED OCT. 9, 1906.
C. HAMANN.
CALCULATING MACHINE.
APPLICATION FILED MAR. 28, 1905.

Witnesses:

Inventor:
Christel Hamann

No. 832,666. PATENTED OCT. 9, 1906.
C. HAMANN.
CALCULATING MACHINE.
APPLICATION FILED MAR. 28, 1905.

Witnesses:

Inventor:
Christel Hamann

No. 832,666. PATENTED OCT. 9, 1906.
C. HAMANN.
CALCULATING MACHINE.
APPLICATION FILED MAR. 28, 1905.

Witnesses:

Inventor:
Christel Hamann
Knight Bros

UNITED STATES PATENT OFFICE.

CHRISTEL HAMANN, OF FRIEDENAU, NEAR BERLIN, GERMANY.

CALCULATING-MACHINE.

No. 832,666.   Specification of Letters Patent.   Patented Oct. 9, 1906.

Application filed March 28, 1905. Serial No. 252,515.

*To all whom it may concern:*

Be it known that I, CHRISTEL HAMANN, engineer, a citizen of Germany, and a resident of Friedenau, near Berlin, Germany, (whose post-office address is Hedwigstrasse 17,) have invented certain new and useful Improvements in Calculating-Machines, of which the following is a specification.

My invention relates to an improved calculating-machine.

In prior calculators toothed wheels having adjustable gear-teeth or the like have been employed to give the result. Another well-known means for obtaining the part products is the stepped roller first used by Leibnitz and consisting of a cylinder with teeth of different lengths. According to my invention I dispense with such devices and use instead a single disk provided with teeth disposed stepwise. The toothed wheels which give the part products can be caused to move radially of this disk and can be rotated by it corresponding to the position occupied.

By reason of the circular arrangement of the toothed wheels, rendered necessary owing to the employment of a disk, the parts of the machine can be compactly located in a very small space. The machine is thus very light and readily partible, being well adapted for the pocket.

The machine can be used to calculate any number of figures, as the circular arrangement of the parts imposes no limit such as there is in the case of machines with figures located one beside the other.

One form of construction of the machine is shown in the accompanying drawings.

The small arrow pointing to the lines on which sections are taken indicate the direction in which the section is seen.

Figure 1:
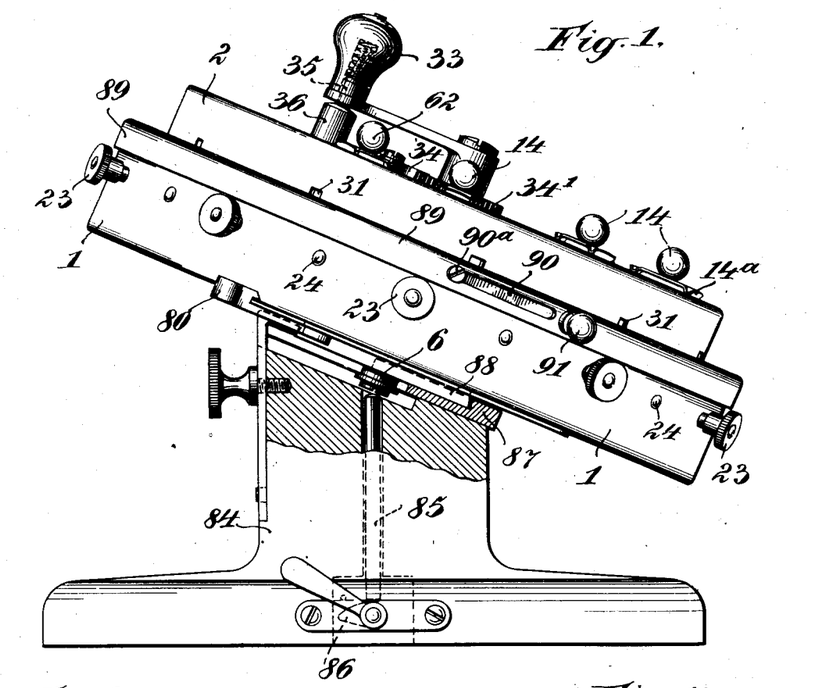
Figure 1 is an elevation and part section of the machine fixed on a stand ready for use.
Figure 2:
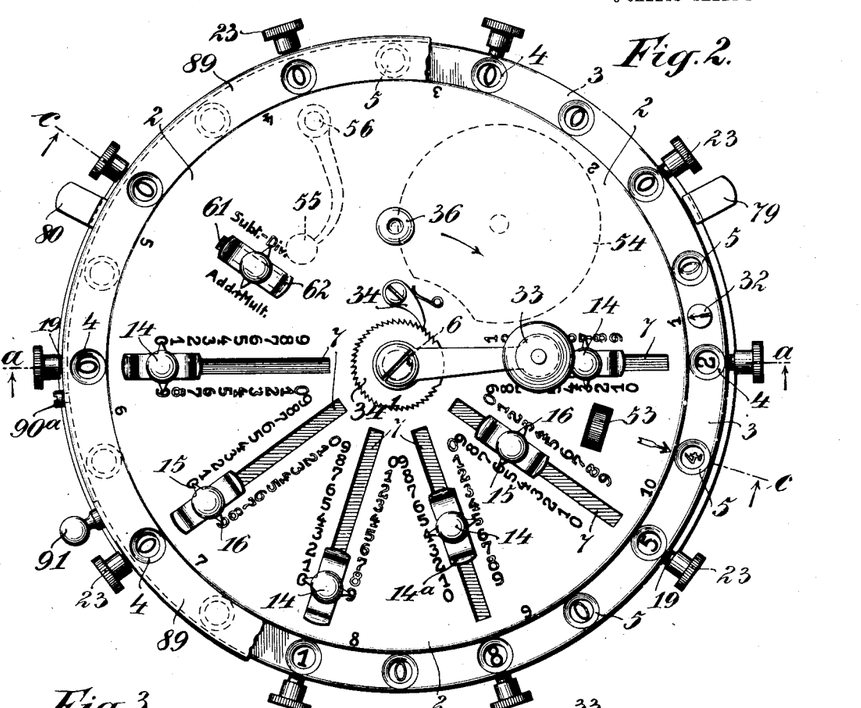
Fig. 2 is a plan of the actual machine, the crank-handle being shown slightly turned out of the position of rest and a portion of the peripheral ring being broken away to display underlying parts.
Figure 3:
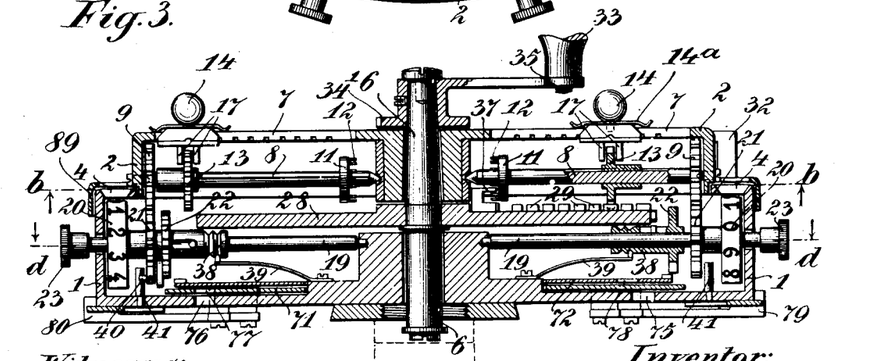
Fig. 3 is a vertical section on the line $a\,a$ of Figs. 2 and 4.
Figure 5:
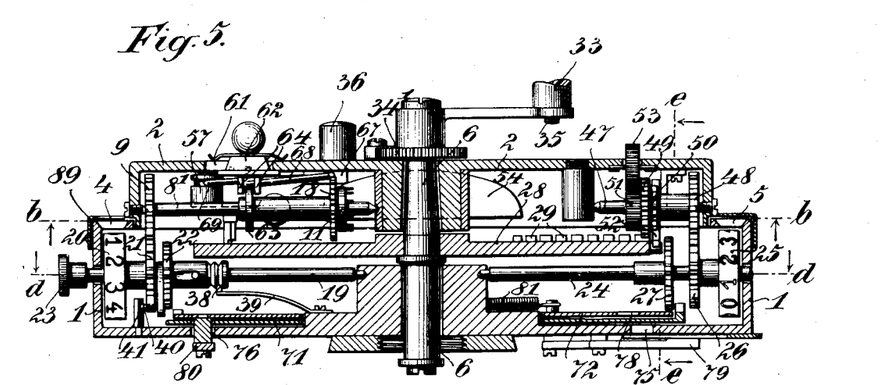
Fig. 5 is a vertical section on the line $c\,c$ of Figs. 2 and 4.

The machine consists of the two main parts 1 and 2, which are flat, open, round box-shaped cases, Figs. 1, 3, and 5. The case 1 is of larger diameter than the case 2 and has a rim or flange 3 at the top perforated at 4 and 5, Figs. 2 and 6. The cases are also perforated centrally to receive the shaft 6, which turns freely therein. The case 2 is superposed in inverted position on the case 1, its edge resting on the flange 3.

The face of the case 2 is provided with radial slots 7, Fig. 2, on each side of which the digits "0" to "9" are inscribed, but in reversed order on the two sides. In the case 2 below each slot 7 is mounted a shaft 8, Figs. 3 and 4, having a small wheel 9 at its outer end provided with ten teeth, in which a spring-detent 10 engages, Fig. 4. Near the inner end of each of the shafts 8 is mounted a pin-wheel 11, the pins 12 of which act as stops in a manner to be hereinafter described, Figs. 3, 4, and 5. On the shaft 8 there is also keyed a ten-toothed wheel 13, with capability of sliding in the direction of length of the shaft. In each slot 7 there works a slide having a knob 14 and pointers 15 16 for indicating the figures of the two columns inscribed on the slot edges opposite which it stands. The slide has also two small pendent plates or cheeks 17, between which the wheel 13 lies, so that it can be slid along by means of the slide. The latter is held in position in well-known manner by a flat spring $14^{a}$. In the case 2 there is also a shaft $8'$, located similarly to the shafts 8, Figs. 4 and 5. This shaft $8'$ likewise carries a toothed wheel 9 and pin-wheel 11, and, furthermore, a toothed wheel 18, located adjacent to the pin-wheel 11 and turned with positive motion by the shaft, while at the same time being capable of sliding to a slight extent on it in longitudinal direction.

The coöperating signal for the tens and the mechanism for use in employing the machine for addition and multiplication or subtraction and division will be explained later.

Figure 6:
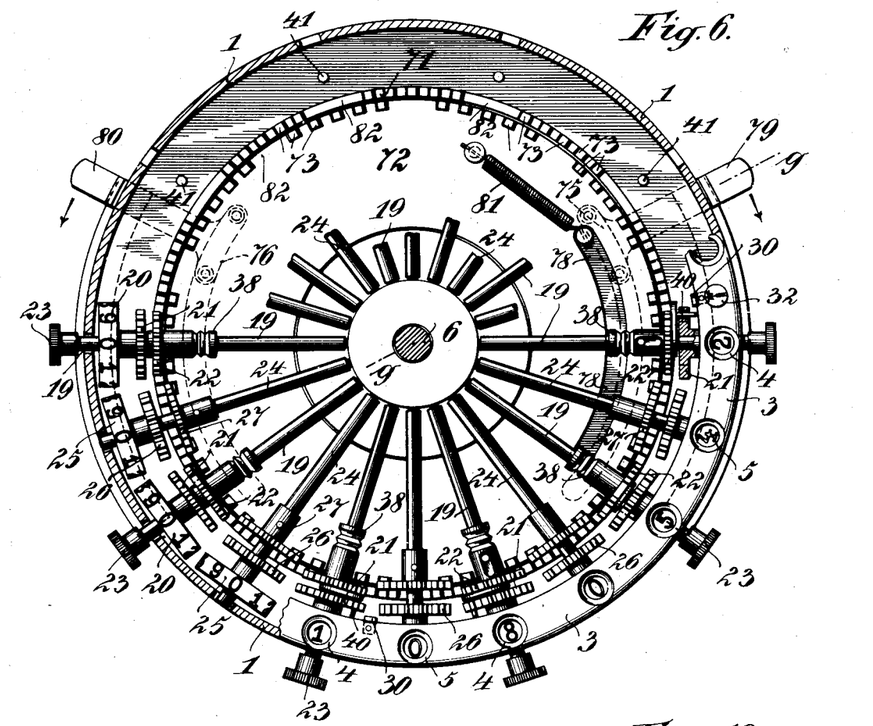
Fig. 6 is a horizontal section on the line $d\,d$ of Figs. 3 and 5, parts being broken away.

In the case 1 there are likewise mounted shafts 19, arranged all round at distances apart corresponding to those between the shafts 8, Fig. 6. Each shaft 19 has mounted on it immediately below the flange 3 a disk or wheel 20, Figs. 3, 5, and 6, provided with the figures "0" to "9," which figures are visible through the apertures 4. On each shaft 19 there is likewise mounted fast a ten-toothed wheel 21, which meshes with the toothed wheel 9 on the shafts 8 8'. A second toothed wheel 22 is also mounted on each shaft 19. These shafts 19 extend through the wall of the case 1 and are provided with heads 23, by means of which the figures can be set by hand in the apertures 4, Figs. 1 and 2.

Between the shafts 19, which correspond to the shafts 8, further shafts 24 are located in the case 1. These latter shafts likewise carry disks 25, provided with figures "0" to "9." The disks 25 may conveniently be of a different color to that of the disks 20 or be otherwise distinguished therefrom. Their figures are visible through the apertures 5, Figs. 2, 5, and 6. Each shaft 24 also has mounted on it two toothed wheels 26 27.

Figure 7:
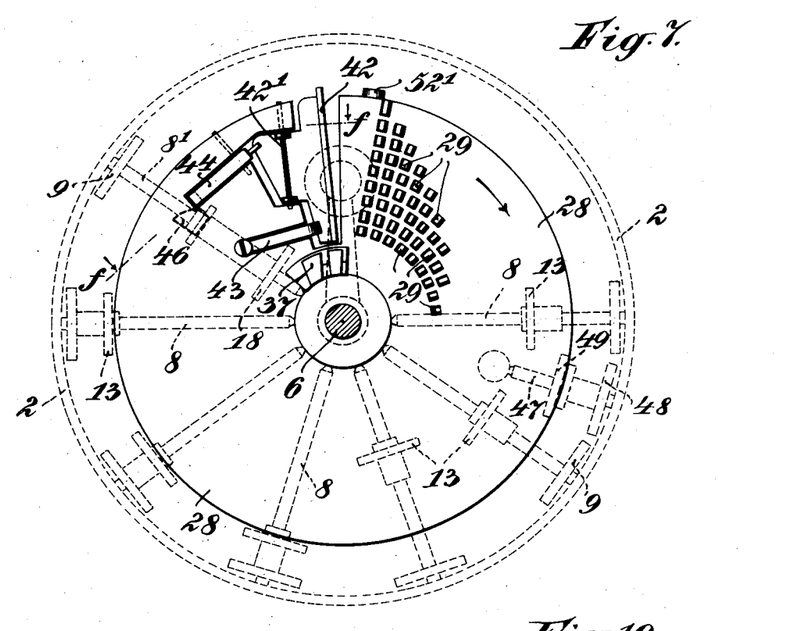
Fig. 7 is a plan of the actuating-disk, some of the parts actuated thereby being shown in dotted lines.

On the shaft 6, which turns loosely in the bosses of the cases 1 2, an actuating-disk 28 is mounted fast. This disk can be rotated independently of the cases 1 2 by means of the crank-handle 33 of the shaft 6, Figs. 3, 5, and 7. On the disk 28 teeth 29 are disposed in concentric circles. These teeth are arranged "stepwise"—that is to say, in the innermost circle there are nine teeth; in the next, eight, and so on, until at length in the outermost circle there is only one tooth. These teeth engage with the toothed wheels 13 in a manner to be hereinafter described.

The operation of the stop device near the center of the disk 28 and the carrying device will be likewise described later.

Figure 4:
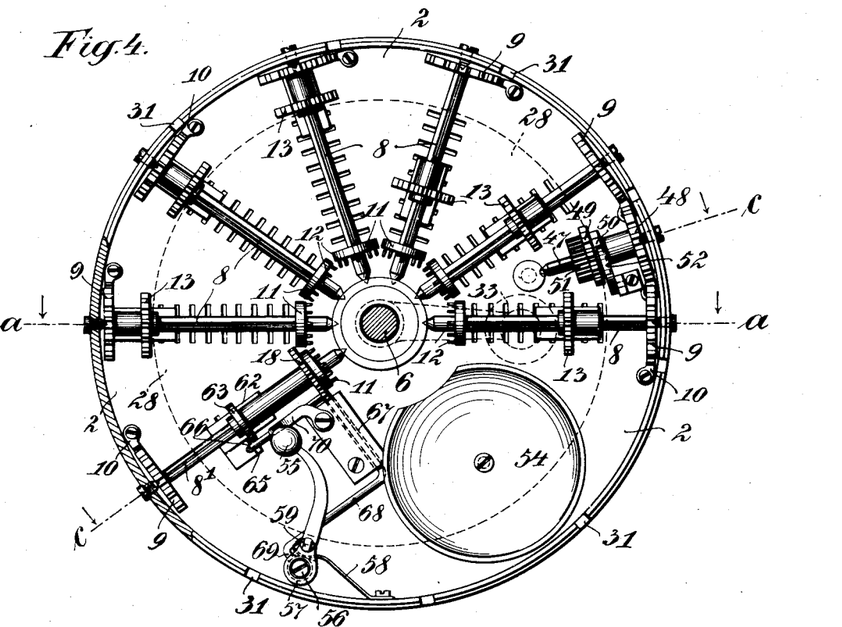
Fig. 4 is a horizontal section on the line $b\,b$ of Figs. 3 and 5.
Figure 12:
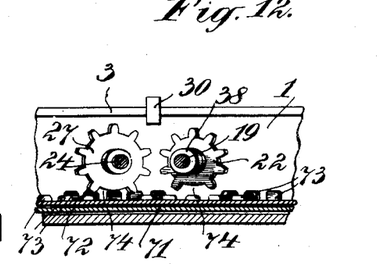
Fig. 12 is a detail view showing two of the wheels for the device for resetting the figure-wheels to zero and the toothed rims operating them.

In order to adjust the cases 1 2 relatively to each other, studs 30 are provided on the flange 3 of the case 1, Figs. 6 and 12, and corresponding notches 31 furnished in the rim of the case 2 to receive them, Figs. 1 and 4. The case 1 is also provided with a pin 32, marked with an arrow, Figs. 2, 3, and 6, and the case 2 can be so adjusted that this arrow points to any desired figure on the periphery of the case 2 in order to indicate in which denomination the calculations are being made.

Over the flange 3 of the case 1, so far as it is not covered by the case 2, there fits a ring 89, Figs. 1, 2, 3, provided with apertures corresponding to the holes 4 5, Fig. 2, left-hand side, so that either the holes 5 are covered and figures visible through the holes 4, or vice versa. The ring is slotted at 90, Figs. 1, 2, and into the slot there projects a pin 90$^a$, secured to the case 1. The length of the slot 90 is such that in the one end position the holes 4 coincide with the perforations in the ring 89, Fig. 2, while in the other end position the holes 5 coincide therewith. The ring 89 can be adjusted by means of the knob 91, Figs. 1, 2.

As already stated, the shaft 6 is provided with a crank 33, which, owing to the provision of a spring-actuated detent 34, acting on a ratchet-wheel 34, can only be turned in one direction. In order to hold the handle 33 in its position of rest, a spring-actuated pin 35 is provided, Fig. 1, engaging in a hollow pin 36 on the case 2.

To prevent the wheels 9 turning farther than intended, owing to their inertia on rapid rotation of the disk 28, whereby errors would be caused, the already-mentioned disk 11 with pins 12 are provided, Fig. 3. On the disk 28, immediately behind the teeth 29 in the direction of rotation, there is located a segmental stop-bracket 37, Figs. 3, 7. This bracket is so arranged that when the disk 28 is rotated it passes between the pins 12 of the disk 11 and holds them for a short interval, which naturally means stoppage of the wheels 9. Since the member 37 lies just behind the teeth 29, the rotary motion on unduly rapid rotation of the machine will be at once stopped, so that even the slightest motion in excess of that intended is prevented and errors thus avoided. In order to release the shafts for the rotary motion in the event of the carrying mechanism being actuated, the actual engaging portion of the bracket 37 is cut away for a short distance, Fig. 7, so that one rotation of the wheel is permitted.

The carrying mechanism is arranged as follows: The toothed wheels 22 are provided with sleeves 38, which slide on the shafts 19, Figs. 3, 5, and 6. These sleeves are grooved to receive the end of springs 39, secured to the base of the case 1, Figs. 3, 5, whereby the sleeves are held in position. From the toothed wheels 22 there project pins 40, which pass through one of the teeth of the adjacent wheel 21. At the bottom of the case 1, adjacent to the toothed wheels 21, stationary pins 41 are located. If in one of the apertures 4 a nine is visible, the pin 40 projecting through the wheel 21 will lie immediately adjacent to the pin 41. On the figure "1" being added the pin 40 on further rotation of the wheel 21 will slide past the pin 41, will be pushed back, and in this manner will cause the sleeve 38 to slide inward. The spring 39 now engaging in the second groove of the sleeve will hold the latter in such position as shown in the right-hand half of Fig. 3.

Figure 9:
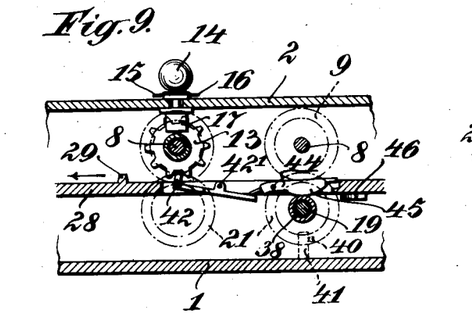
Fig. 9 is a vertical section on the line $f\,f$ of Fig. 7, showing the carrying mechanism—that is, the mechanism for transferring from a lower to a higher denomination which in the succeeding specification and in the claims should be termed as "carrying device.

On the disk 28, behind the teeth 29 in the direction of rotation, there is a lever 42, mounted on a shaft 42'. This lever is nearly of the length of the complete radius and acts as feed device or tooth for the carrying operation, Figs. 7 and 9. Ordinarily this lever is depressed by a spring 43, let into the disk, so that it does not project above the surface of the latter. One arm of the lever 42 is acted upon by the end of a double-armed lever 44, the other extremity of which has a swelling 45 projecting below the disk 28, Fig. 9. Usually this swelling is in no way obstructed on rotation of the disk 28. If, however, through the rotation of a disk 20 beyond "9" one of the sleeves 38 is caused to slide inward, this sleeve will come into the path of the swelling 45. The latter will thus be raised by the sleeve and accordingly causes the free end of the lever 42 to rise, so that the latter projects above the surface of the disk 28 as a tooth. On further rotation this end of the lever 42 will engage with the wheel 13, mounted on that shaft 8 which in the direction of rotation lies next to it, Fig. 9, and the wheel 13 will thus be turned through the space of one tooth. This movement will be transmitted to the corresponding wheel 20 by means of the coöperating toothed wheels 9 and 21. The end of the lever 42 is of such breadth that it actuates the wheels 13 in whatever position they occupy, whether at "0" or other figure.

Figure 10:
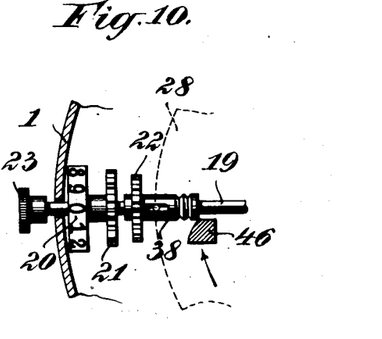
" Fig. 10 is a detail view showing one of the sleeves and the coöperating stud on the actuating-disk.

Since carrying must be done only during rotation of the crank, the sleeve 38 must be returned to its initial position again on completion of the operation. For this purpose a stop 46 is provided close behind the swelling 45 of the lever 44, which stop again forces the sleeve outward, Figs. 7, 9, 10.

Figure 8:
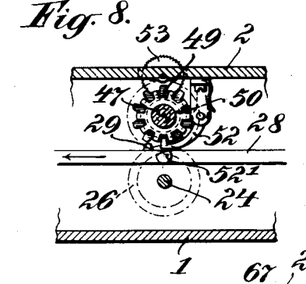
Fig. 8 is a vertical section on the line $e\,e$ of Fig. 5, showing the rotations-indicating device in elevation.

For the purpose of indicating the number of rotations of the crank in each denomination the following arrangement is provided. Between the first and second slots 7 or shafts 8 (counting in the direction of rotation of the crank) a short shaft 47, Figs. 4, 5, 8, is mounted in the case 2, and on this shaft are mounted fast two toothed wheels 48 49, a stop-wheel 50, and a knurled wheel 51. The wheel 48 meshes with the wheel 26 of the shaft 24, which lies below for the time being. The wheel 49 is so arranged relatively to the disk 28 that it engages the extreme outer tooth of the rows 29, Fig. 7, so that it advances through the space of one tooth at each rotation of the disk. The rotation is transmitted to the wheel 26 by the wheel 48, and thus to the corresponding figure-disk 25.

Since in each denomination only naught to nine rotations can be made, no carrying mechanism is necessary for the figure-wheel 25. On adjusting the case 2 for the purpose of making further calculations in another denomination the toothed wheel 48 comes into engagement with the adjacent toothed wheel 26, so that by means of the figure-wheels 25, depending upon the nature of the calculation, there will be indicated in addition the number of terms of the sum, in multiplication the multiplier, in subtraction the number of subtrahends, and in division the quotient.

In order to prevent the wheels 48 and 49 turning more than one tooth at each rotation of the disk 28, the stop-wheel 50 is employed. In this wheel there engages a detent 52, secured to the inner wall of the case 2. This detent is pressed against the wheel 50 by a pin 52' on the disk 28, whereby the inertia of the wheels 48 49 is counteracted, Fig. 8. A wheel 53, Figs. 2, 5, 8, projecting through the case 2 and engaging with the wheel 51, enables any desired figure to be brought before one of the figure-apertures 5 by hand.

Figure 13:
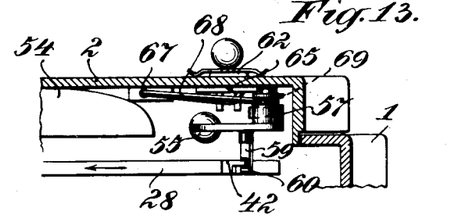
Figs. 13 and 14 are detail views showing the method of actuation of the bell-hammer in different kinds of calculations.
Figure 14:
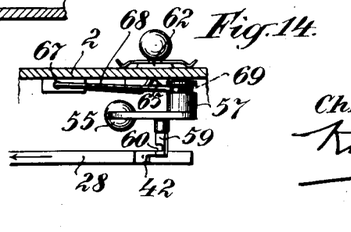

As Fig. 2 shows, in the machine illustrated six slots 7 with slides 14 are employed, so that with this particular machine a factor of six places can be set up. A product formed with these, however, may contain many more than six places. In the formation of the product carrying beyond the sixth place is then naturally also necessary. From the sixth place these carryings are transmitted to the shaft 8', located, as already stated, at a like distance apart to the shafts 8 within the case 2. On the shaft 8' there is mounted a toothed wheel 18, which, in the position shown in Figs. 4, 5, and 7, does not engage with any of the rows of teeth 29 on the disk 28. The lever 42, however, is inwardly prolonged, so that when the wheel 20 of the shaft 8 next preceding the shaft 8' has been turned from "9" to "0" it engages the wheel 18 and by coöperation of the wheels 9 and 21 effects rotation of the corresponding figure-wheel 20. If now it is necessary to carry from this figure-wheel 20 to the next higher place, no operating elements are provided. There would, therefore, be an error in the result, since no carrying is possible. In order to signal this omission of carrying, so that the result may be corrected by rotation of the corresponding head 23 through one place, a gong 54 is located in the case 2, struck by a hammer 55, Figs. 4, 5, and 13. The hammer 55 is secured to a hollow pin 57, which turns on the pivot 56. This pin 57 is flattened at one part so that a spring 58 may act upon it and maintain it in its position of rest. On the hammer-arm is a pin 59, Figs. 4, 13, 14, notched at 60. This pin extends to the level of the disk 28 and lies close against it. The lever 42, projecting laterally beyond the disk 28, passes in its position of rest on rotation of the disk 28 through the notch 60, so that it does not contact with the pin 59, Fig. 13. If now it is required to carry from the figure-wheel corresponding to the shaft 8' to the next higher place, the sleeve 38, mounted on the shaft 19 below, is slid inward in the manner already described, and the swelling 45 of the lever 44 lifts the lever 42. The laterally-projecting portion of the latter cannot now pass through the notch 60 of the pin 59, but presses against the latter, and thus causes the hammer 55 to strike the gong 54, whereupon the spring 58 returns the hammer to its original position.

The machine cannot be used at once for subtraction and division, as rotation in the reverse direction would be necessary therefor, and this would involve a correspondingly different position of the parts. By means of the mechanism now to be described, however, the machine while rotating in the same direction may also be employed for these other methods of calculation, as will be explained subsequently by means of an example.

The toothed wheel 18, mounted on the shaft 8', is connected by a sleeve with a disk 63, which can be slid by means of a slide 62, projecting through a slot 61 in the case 2 and having cheeks 64, which seize the wheel 63 on each side, Figs. 2, 4, and 5.

Adjacent to the slide there is marked on the case 2 on the side "$a+$" and on the other side "$a-$" to indicate the nature of the calculation, while the slide itself is furnished with lateral pointers which can be adjusted so as to point to one of the said signs. At the side of the signs the kinds of calculation are still more precisely indicated.

On addition and multiplication the slide 62 occupies the position shown in Figs. 2 and 5, the wheel 18 lying beyond the province of the teeth 29 on the disk 28. On subtraction and division the slide 62 must be so slid that the wheel 18 comes into the course of the nine inner teeth 29 of the disk 28, as will be clear from subsequent explanations. The slide 62 is also provided on its side lying toward the center of the machine with an inclined surface 65, Figs. 4, 13. On the upper edge of this face there lies in the position shown (that for addition and multiplication) the end 66 of a U-shaped bow 68, the central portion of which turns at 67. The other end 69 of this bow engages a groove in the hollow pin 57 of the hammer 55, Figs. 4, 5, 13. A spring 70 secured to the part 67, acts on the end 66 of the bow, and thus maintains it in contact with the surface 65. If the slide 62, for the purpose of subtraction or division, is moved into its other position, the end 66 of the bow slides down the face 65, and thus the end 69 descends also and causes sliding of the hollow pin 57, Fig. 14.

In order that the figures which have appeared in the holes 4 5 may on completion of the calculation again be adjusted to naught, the following device is provided: At the bottom of the case 1 there are two rotary disks 71 72, of which the former is the larger. Both disks are at their periphery provided with teeth 73, Figs. 6 and 11. The teeth of the disk 71 lie in the plane of the wheels 22 of the shafts 19 and mesh with them, while the teeth of the disk 72 can be brought into engagement with the toothed wheels 27 on the shafts 24. The wheels 22 and 27 have only nine teeth, while in place of the tenth tooth there is a gap 74, Fig. 12. These gaps 74, when the naught is to be seen through the holes 4 5, are directed downward toward the disks 71 72.

Figure 11:
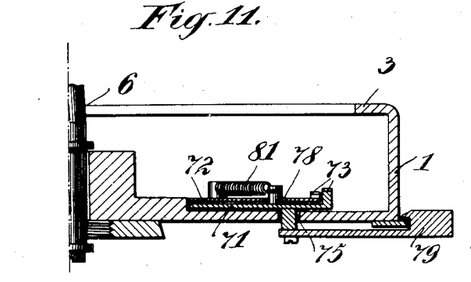
Fig. 11 is a vertical section on the line $g\,g$ of Fig. 6, showing the operation of the device for resetting the figure-wheels to zero.

The case 1 has on its base two concentric slots 75 76, Figs. 3, 6, 11. The disks 71 72 likewise have slots 77 78. The disk 71 is provided with an arm 79, which projects through the slot 75 and extends laterally beyond the case 1. By means of this arm the disk can be turned in the direction of the length of the slot 75. Similarly the disk 72 has an arm 80, Figs. 5 and 6, projecting through the slots 76 77. On the disk 72 is secured a spring 81, the other end of which is fastened to the disk 71 in such manner that in the position of rest of the disks the spring is contracted. When the disk 71 is turned by the arm 79 in the direction of the arrow, Fig. 6, the disk 72 cannot follow, since the arm 80 is held by the end of the slot 76. The spring 81 will thus be extended and on release of the arm 79 will draw back the disk into its initial position again. During rotation the teeth 73, when the figure-disks 20 stand at other figures than the naughts, will engage with the wheels 22 and will rotate these latter until the gaps 74 come downward, whereupon the teeth 73 will pass freely below the wheels, Fig. 12.

The same procedure occurs when the disk 72 is turned in the direction of the arrow, Fig. 6, by the arm 80. The same spring 81 will then be extended, as in this case the disk 71 is held in its position of rest and on release will return the disk 72 to its initial position. Here the teeth 73 engage with the wheels 27 when the figure-disks 25 stand at other figures than naught and turn these wheels until the gaps 74 come downward, when the naught again appears in the aperture.

In order that the free rotation of the toothed wheels 22 27 may not be affected during the process of calculating by the teeth 73 of the disks 71 72, these teeth are not arranged in continuity on the disks 71 72, gaps 82 being provided, which in the position of rest are located below the wheels 22 27.

In order to render the machine handy for operation, a handle 83 may be screwed into the case, as shown in Fig. 3. The machine can then be held in the left hand and the calculating done with the right, or if both hands are to be free the calculator be mounted on a foot 84, having an inclined top, as shown in Fig. 1. The foot must be sufficiently heavy to firmly hold the machine while the calculations are being made. To facilitate elevation of the case 2 for purposes of rotation and adjustment, the foot may be provided with a pin 85, raised by a lever with cam 86. The pin 85 presses against the shaft 6 and lifts it and the case 2 on operation of the lever with cam 86, whereby the studs 30 on the rim of the case 1 are disengaged from the notches 31 in the edge of the case 2. The foot is provided with a plate 87, onto which the projecting portion 88 at the bottom of the case 1 fits. If now a calculation—for example, a multiplication—is to be undertaken, the knobs 14 must be pushed along to adjust the pointers 15 to the figures on the left of the slots, starting from the right with the units. The knob in the slot 61 must be set to "Addition and multiplication." The case 2 must be adjusted relatively to the case 1, so that the figure "1" stands before the arrow of the indicator 32. In the hole 4, which lies to the left of this indicator, the units place of the result of the calculation will thus be visible, and at the indicator, therefore, the reading of the result of the calculation commences.

The ring 89 is so adjusted that the apertures in it coincide with the holes 5. The multiplier can thus be seen, and it can be checked whether the proper number of rotations are made at each place.

Since between the first and second slots (in the direction of rotation) the device for indicating the number of rotations is located, the units-figure will appear in the hole 5, located between these two slots. For instance, if the number "463" is to be multiplied by "34" then in the first slot the pointer 15 of the knob 14 must be set at "3," in the next slot at "6," and in the third slot at "4," Fig. 2. Owing to the knobs 14 being slid along in this manner, the wheels 13 on the shafts 8 will be moved so that they engage with those rows of teeth 29 on the disk 28 whose numbers of teeth correspond with the figures pointed to at 15. Thus on turning the disk 28 by means of the handle 33 the wheel 13 of the units place comes into engagement with three teeth 29, the wheel 13 of the tens place with six teeth, and the wheel 13 of the hundreds place with four teeth. By means of the corresponding wheels 9 and 21, Fig. 3, these rotations are transmitted to the corresponding figure-disks 20 and the corresponding figures will appear in the respective holes 4. On the next rotation this process will be repeated. There will again be a rotation of the figure-wheels 20 corresponding to the figures in question. Thus in the case of the number under consideration there will appear in the units place "6," in the tens place "2," and in the hundreds place "8." The figure-wheel 20 of the tens place will have now traveled beyond the "9," whereby the carrying device will be adjusted so that the figure-wheel 20 of the hundreds place will turn not only through the number of teeth corresponding to the figure set, but (by reason of the engagement of the lever 42) also through the space of a further tooth, so that now instead of the "8" a "9" will become visible. Thus there will be read "926." Two more turns have now to be given, whereby the partial product "1852" for the units place of the multiplier is formed, Fig. 2. In the hole 6 between the figures "2" and "5" the units-number "4" of the multiplier is visible, Fig. 2. The case 2 must now be so turned relatively to the case 1 that instead of the figure "1" at the indicating-pin 32 the next figure on the periphery of the case 2—that is to say, the figure "2"—comes opposite this pin. In this manner the slot of the units place comes to rest above the tens place of the partial product. The calculation for the tens place of the multiplier can now be made. After three rotations the product desired is ascertained. By rotation of the case 2 that portion of the rotations-counting mechanism lying within it is likewise advanced by one place. The tens-figure of the multiplier will now become visible here.

When the calculation is complete, it is only necessary to bring the ring 89 into its other position, in which the perforations cover the holes 4, when the figures visible in the same give the result of the calculation. In this machine the reversing-gear usually employed in calculators for negative calculations is dispensed with, as it would only tend to render the machine more complicated. Such calculations, therefore, are to be made in such manner that the decadal completion of the subtrahend is introduced into the adjusting device, so that the calculation can be completed with the same crank rotation as for addition.

In order to render mental calculation unnecessary for the decimal completion, a row of figures in reversed order is provided at the right-hand side of the slots 7, as already stated. These figures give the decadal completion of the corresponding figures on the opposite side of the slot. Thus at the first slot on the right are the figures "1, 2, 3" opposite "9, 8, 7," the completion or sum in each case being ten. At the other slots, opposite to "9 8 7," there stand "0," "1," "2," &c., so that the figures to be read in the slots in question are always completed to the next higher power of ten. For example, 99 + 01 = 100, 731 + 269 = 1,000, &c. The method of making negative calculations will be clear from the following example. From the number "2314" (minuend) subtract the number "538," (subtrahend.) After adjusting the pointers to the latter number in the right-hand figure-columns the number "999,462" will be read in the left-hand columns. "462" is the decadal completion of "538." As the unused higher places have also to be set to the naughts on the right, the decadal completion "1,000,000" results.

As already mentioned, adjacent to the slot of the highest place there is the additional shaft 8', with an extra toothed wheel 18, which is brought to the level of the toothed wheels 13, adjusted to naught by shifting of the slide 62. In this manner to the decadal completion "1,000,000" there is added another "9,000,000." Thus the actual calculation is

```
    2314
 9999462
---------
10001776
```

Since, however, the tens-carrying mechanism only operates for one place beyond the places of the adjusting mechanism—that is to say, in the present instance only to the seventh place—the resulting eighth place will not be attained by the carrying device. Thus there will result correctly:

Left reading:

```
    2314
 9999462
---------
 0001776
``` or right reading

```
    2314
 0000538
---------
 0001776
```

If in making additions or multiplications there is no carrying performed after the seventh place, the hammer 55 will be actuated by the lever 42 striking the pin 59, as already stated, whereby the gong 54 will be rung.

By shifting of the slide 62 the hollow pin 57, (which carries the hammer 55,) and with it the pin 59, will be raised, as already described, so that the lever 42 can now pass unobstructed through the notch 60, whereas in the other position of the slide 62 it struck the pin 59. In this manner the tens-signal is also given in subtraction and division at the right moments and shows when a unit is to be subtracted from the highest place.

Having thus described my invention, I claim as new—

1. In a calculating-machine in which the various places of the result are displayed in circular order, in combination, an adjusting mechanism, an indicating mechanism, and an actuating mechanism for all places in common, operating the indicating mechanism corresponding to the values set in the adjusting mechanism, substantially as described.

2. In a calculating-machine in which the various places of the result are displayed in circular order, in combination, an adjusting mechanism, comprising a plurality of shafts, a gear mounted on each shaft, and means for sliding the gears longitudinally on their shafts; an actuating-disk for all the gears in common, presenting rows of teeth adapted to mesh with the said gears; means for rotating the disk; an indicating mechanism; and means for transmitting the rotations of the said gears to the indicating mechanism; substantially as described.

3. In a calculating-machine in which the various places of the result are displayed in circular order, in combination, a plurality of radial shafts; a gear mounted on each shaft; a radially-slotted cover-plate; slides working in the slots, and sliding the said gears longitudinally on the shafts below; an actuating-disk for all the said gears in common, presenting concentric rows of teeth adapted to mesh with the said gears; means for rotating the disk; an indicating mechanism; and means for transmitting the rotations of the said gears to the latter, substantially as described.

4. In a calculating-machine in which the various places of the result are displayed in circular order, in combination, a plurality of radial shafts; a gear mounted on each shaft; means for sliding the gear longitudinally on its shaft; an actuating-disk for all the said gears in common, presenting concentric rows of teeth, adapted to mesh with the said gears; means for rotating the disk; a second series of radial shafts; a figure-wheel mounted on each of these latter shafts; and means for transmitting the rotations of the first series of shafts to the second series; substantially as described.

5. In a calculating-machine in which the various places of the result are displayed in circular order, in combination, an adjusting mechanism, comprising a plurality of radial shafts, a gear mounted on each shaft, and means for sliding the gear longitudinally on its shaft; a rotary actuating mechanism for all places in common, adapted to rotate the said gears corresponding to the values set in the adjusting mechanism, a stop device mounted on each said shaft, and a stop device carried by the actuating mechanism, said stop devices coöperating to stop the rotation of said shafts at intervals; an indicating mechanism; and means for transmitting the rotations of the said shafts to the indicating mechanism; substantially as described.

6. In a calculating-machine in which the various places of the result are displayed in circular order, in combination, a plurality of radial shafts, a gear mounted on each shaft, and means for sliding the gear on its shaft; a rotary disk actuating the said gears; a second series of radial shafts, a figure-wheel mounted on each of the latter, and means for transmitting the rotations of the said gears to the second series of shafts; a tens-carrying tooth for all places in common, mounted on the disk and adapted to engage with the said sliding gears; sliding members on the second series of shafts; means for actuating the same; and means operated by the said sliding member, whereby the tens-carrying tooth is caused to engage with the sliding gears; substantially as described.

7. In a calculating-machine in which the various places of the result are displayed in circular order, in combination, an adjusting mechanism, an indicating mechanism; a rotary actuating mechanism for all places in common, operating the indicating mechanism corresponding to the values set in the adjusting mechanism; and means for counting the rotations of the actuating mechanism, comprising a radial shaft, a gear on the same meshing with a tooth of the actuating mechanism, a plurality of radial shafts, a figure-wheel mounted on each of these shafts, and means for transmitting the rotations of the said gear to one of the said latter radial shafts; substantially as described.

8. In a calculating-machine in which the various places of the result are displayed in circular order, in combination, an adjusting mechanism, a plurality of shafts, a figure-wheel on each shaft, means for operating these wheels corresponding to the values set in the adjusting mechanism, a mutilated gear on each shaft, a disk presenting circularly-disposed groups of teeth adapted to mesh with the gears, and means for rotating the disk, substantially as described.

9. In a calculating-machine in which the various places of the result are displayed in circular order, in combination, an adjusting mechanism, an indicating mechanism, means for operating the latter corresponding to the values set in the adjusting mechanism, a rotations-counting mechanism, a plurality of shafts and a figure-wheel on each shaft, a mutilated gear on each shaft, a disk presenting circularly-disposed groups of teeth, adapted to mesh with the gears, and means for rotating the disk, substantially as described.

10. In a calculating-machine in which the various places of the result are displayed in circular order, in combination, an adjusting mechanism; an indicating mechanism and a rotations-counting mechanism and means for operating these two latter mechanisms, said indicating and counting mechanisms each possessing an equal number of figure-wheels circularly disposed and alternating with each other; a case containing the said mechanisms, perforated at the figure-wheels; a perforated ring moving over the perforations in the case, and means for rotating the ring through the distance between two adjacent case perforations; substantially as described.

11. In a calculating-machine in which the various places of the result are displayed in circular order, in combination, a slotted case comprising two parts one of which can be rotated relatively to the other; a plurality of radial shafts 8 in one part of the case, a gear 13 on each shaft, located below a case-slot, a slide working in each slot and sliding one of said gears on its shaft; a plurality of radial shafts 19 in the other part of the case, a figure-wheel 20 on each latter shaft, a central shaft 6; a disk mounted on said shaft, presenting concentric rows of teeth meshing with the gears 13 on the first said shafts 8; gears for transmitting the rotations of the first said shafts 8 to the second said shafts 19; a carrying-tooth mounted on the disk; means for causing the said tooth to mesh with the first said gears 13; a rotations-counting mechanism actuated by the said disk and possessing a plurality of radial shafts 24 located between the second said shafts 19, a figure-wheel 25 on each of the counting-mechanism shafts 24; and means for returning the said figure-wheels 20 and 25 to the zero position; substantially as described.

12. In a calculating-machine in which the various places of the result are displayed in circular order, in combination, a plurality of shafts, a gear on each shaft and means for sliding the gears longitudinally on their shafts; a rotary disk for rotating the said gears; a second series of shafts, a figure-wheel on each of the same, and means for transmitting the rotations of the said gears to the figure-wheels; a carrying-tooth carried by the said disk; means for causing the tooth to engage with the said gears; an audible signal located in the case, and means actuated by the carrying-tooth for operating the same, substantially as described.

13. In a calculating-machine, in combination, an adjusting mechanism presenting for each place a group of figures, and a second group of figures located adjacent to the first group and so disposed that the figures of the second group are completed by the corresponding figures of the first group through all places *seriatim* to the power of "10" corresponding to the number of the places; an indicating mechanism; means for transferring the completion value introduced by the second group to the said indicating mechanism; and means of enabling correct indication of the result thus in excess to the extent of the corresponding power of "10," substantially as described.

14. In a calculating-machine, in combination, an adjusting mechanism presenting for each place a group of figures and a second group of figures located adjacent to the first group and so disposed that the figures of the second group are completed by the corresponding figures of the first group through all places *seriatim* to the power of "10" corresponding to the number of the places; an indicating mechanism; a completing mechanism, located adjacent to the highest place of the adjusting mechanism whereby the value "9" can be introduced; means for transferring this entire value of the said indicating mechanism; and means for throwing the said completing mechanism into and out of operation; substantially as described.

15. In a calculating-machine, in combination, an adjusting mechanism, presenting for each place a group of figures and a second group of figures located adjacent to the first group and so disposed that the figures of the second group are completed by the corresponding figures of the first group through all places *seriatim* to the power of "10" corresponding to the number of the places; an indicating mechanism; a completing mechanism located adjacent to the highest place of the adjusting mechanism whereby the value "9" can be introduced; means for transferring this entire value to the said indicating mechanism; means for throwing the said completing mechanism into and out of operation; a carrying mechanism for the places of the indicating mechanism corresponding in number to those of the adjusting mechanism; an audible signal; means for actuating the same by means of the carrying mechanism; and means for disengaging the signal-operating mechanism; substantially as described.

16. In a calculating-machine, in which the various places of the result are displayed in circular order, in combination, a plurality of shafts, a gear on each shaft, a cover-plate having radial slots and presenting at each slot a group of figures 0–9 and a second group of figures adjacent to the first and so disposed that the figures of the second group are completed by the corresponding figures of the first group through all places *seriatim* to the power of "10" corresponding to the number of the places; slides working in the cover-plate slots and sliding the gears on their shafts, a completing mechanism located adjacent to the highest place of the adjusting mechanism whereby the value "9" can be introduced, there being at the said completing mechanism a shaft, a gear mounted thereon and means for sliding the gear on its shaft; an indicating mechanism, means for rotating the first said gears and the gear at the completing mechanism, corresponding to the values introduced and means for transmitting the rotations of the said gears to the indicating mechanism; a tens-carrying mechanism for the places of the indicating mechanism corresponding in number to those of the adjusting mechanism; an audible signal, means for actuating the same by means of the tens-carrying mechanism, and means for disengaging the said signal-operating mechanism by actuating the said completing mechanism; substantially as described.

17. In a calculating-machine in which the various places of the result are displayed in circular order, a plurality of radial shafts 8 a gear 13 on each shaft, a cover-plate having radial slots 7 and presenting at each slot a group of figures 0–9 and a second group of figures adjacent to the first and so disposed that the figures of the second group are completed by the corresponding figures of the first group through all places *seriatim* to the power of "10" corresponding to the number of the places, a slide 14 working in each cover-plate slot 7 and sliding a gear 13 on its shaft 8; a supplementary shaft 8' located adjacent to the highest place of the adjusting mechanism, a gear 18 on this shaft 8' above which the cover-plate has a slot 61, a slide 62 having an inclined face, working in this slot 61 and sliding the last said gear 18 on its shaft; an actuating-disk 28, having concentric rows of teeth adapted to engage with and actuate on the said gears 13, 18; means for rotating the disk; an indicating mechanism and means for transmitting the rotations of the said gears 13, 18 to the same; a carrying-tooth 42 on the actuating-disk 28 and means for causing this tooth to mesh with the said gears 13, 18; a gong; an axis, a spring-controlled bell-hammer turning on and sliding on the axis and having a notched projection lying in the path of the said carrying-tooth 42 but ordinarily allowing the latter to pass through the notch; and a bow hinged to the case of the machine, one end of which rests on the inclined-faced slide 62 while the other end engages with the boss 57 of the said bell-hammer; substantially as described.

In witness whereof I have hereunto set my hand in the presence of two witnesses.

CHRISTEL HAMANN.

Witnesses:
HENRY HASPER,
WOLDEMAR HAUPT.